(12) United States Patent
Swarup et al.

(10) Patent No.: US 9,120,916 B1
(45) Date of Patent: Sep. 1, 2015

(54) ACRYLIC POLYMERS, CURABLE FILM-FORMING COMPOSITIONS PREPARED THEREFROM, AND METHOD OF MITIGATING DIRT BUILD-UP ON A SUBSTRATE

(71) Applicant: PPG INDUSTRIES OHIO, INC., Cleveland, OH (US)

(72) Inventors: Shanti Swarup, Allison Park, PA (US); Xiangling Xu, Pittsburgh, PA (US); Noel Rawle Vanier, Wexford, PA (US); Mark Edward Endlish, Chicora, PA (US); Dennis Simpson, Sarver, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/302,521

(22) Filed: Jun. 12, 2014

(51) Int. Cl.
| | |
|---|---|
| *C08L 33/16* | (2006.01) |
| *C08L 75/04* | (2006.01) |
| *C08L 83/10* | (2006.01) |
| *C08F 220/22* | (2006.01) |
| *C08F 220/26* | (2006.01) |
| *C08K 3/36* | (2006.01) |
| *C08K 5/29* | (2006.01) |

(52) U.S. Cl.
CPC . *C08K 3/36* (2013.01); *C08L 33/16* (2013.01); *C08L 75/04* (2013.01); *C08L 83/10* (2013.01)

(58) Field of Classification Search
USPC .................................. 524/493, 588, 544, 558
See application file for complete search history.

(56) References Cited

U.S. PATENT DOCUMENTS

| | | | |
|---|---|---|---|
| 7,122,599 B2 | 10/2006 | Haubennestel et al. |
| 2006/0286305 A1 | 12/2006 | Thies et al. |
| 2007/0238804 A1 | 10/2007 | Ho et al. |
| 2008/0241408 A1 | 10/2008 | Cumberland |
| 2010/0069551 A1 | 3/2010 | Minge et al. |
| 2013/0310464 A1 | 11/2013 | Jaunky et al. |

FOREIGN PATENT DOCUMENTS

| | | |
|---|---|---|
| CN | 102093697 B | 10/2012 |

OTHER PUBLICATIONS

Machine Translation of CN102093697B to Lai et al.*
Carneiro et al, "Nanocomposite Acrylic Paint with Self-cleaning Action", J. Coat. Technol., 2012 pp. 687-693, Res. 9 (6).

* cited by examiner

*Primary Examiner* — Vu A Nguyen
(74) *Attorney, Agent, or Firm* — Krisanne Shideler

(57) ABSTRACT

The present invention is directed to acrylic polymers comprising: (i) hydroxyl functional groups; (ii) polydialkylsiloxane functional groups; and (iii) silica nanoparticles that are chemically bonded to and pendant from the acrylic polymer. The present invention is further directed to curable film-forming compositions comprising acrylic polymers, and to coated substrates comprising the curable film-forming composition applied to at least one surface of the substrates. The present invention is also drawn to methods of mitigating dirt build-up on a substrate, comprising applying to at least a portion of the substrate the curable film-forming composition described above and at least partially curing the curable film-forming composition.

20 Claims, No Drawings

ACRYLIC POLYMERS, CURABLE FILM-FORMING COMPOSITIONS PREPARED THEREFROM, AND METHOD OF MITIGATING DIRT BUILD-UP ON A SUBSTRATE

FIELD OF THE INVENTION

The present invention relates to acrylic polymers, curable film-forming compositions prepared therefrom, and methods of mitigating dirt build-up on substrates.

BACKGROUND OF THE INVENTION

Easy cleaning of coated surfaces is a significant selling point for many industries, in both consumer and industrial markets. Easy removal of dirt and prevention of dirt build-up are desirable properties for products such as automobiles. Environmental contaminants such as tar, asphalt, animal droppings, road salt, detergents, and the like may damage the surface of coated vehicles, architectural surfaces, and other industrial substrates. Damage may be caused by a chemical reaction of the contaminant with the coated surface such as by chemical etching, or may involve physical removal of part or all of the coating from the substrate (i.e., "cohesive failure") upon removal of the contaminant during cleaning. Cohesive failure may also involve incomplete removal of the contaminant from the coated surface during cleaning.

It would be desirable to provide polymers and coating compositions that may be used in methods of mitigating dirt build-up on a substrate in order to prevent such damage to coatings.

SUMMARY OF THE INVENTION

The present invention is directed to acrylic polymers comprising: (i) hydroxyl functional groups; (ii) polydialkylsiloxane functional groups; and (iii) silica nanoparticles that are chemically bonded to and pendant from the acrylic polymer. The present invention is further directed to curable film-forming compositions comprising acrylic polymers, and to coated substrates comprising the curable film-forming composition applied to at least one surface of the substrates.

The present invention is also drawn to methods of mitigating dirt build-up on a substrate, comprising applying to at least a portion of the substrate the curable film-forming composition described above, and at least partially curing the composition.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

By "polymer" is meant a polymer including homopolymers and copolymers, and oligomers. By "composite material" is meant a combination of two or more different materials.

The term "(meth)acrylate" is meant to encompass acrylate and/or methacrylate molecular structures where they exist.

The acrylic polymer of the present invention comprises: (i) hydroxyl functional groups; (ii) polydialkylsiloxane functional groups; and (iii) silica nanoparticles that are chemically bonded to and pendant from the acrylic polymer.

The acrylic polymer of the present invention can be prepared from a reaction mixture comprising:
 (i) an ethylenically unsaturated monomer comprising hydroxyl functional groups;
 (ii) an ethylenically unsaturated monomer comprising polydialkylsiloxane functional groups; and
  (iii) silica nanoparticles that have been surface modified with compounds comprising ethylenically unsaturated functional groups.

Useful hydroxyl functional ethylenically unsaturated monomers for use as (i) include hydroxyalkyl(meth)acrylates, typically having 2 to 4 carbon atoms in the hydroxyalkyl group, such as hydroxyethyl(meth)acrylate, hydroxypropyl (meth)acrylate, 4-hydroxybutyl(meth)acrylate, hydroxy functional adducts of caprolactone and hydroxyalkyl(meth) acrylates, as well as the beta-hydroxy ester functional monomers described below.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl(meth)acrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl(meth)acrylate is preferred. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl)phenyl glycidyl ether. Commonly used glycidyl esters include those of the structure:

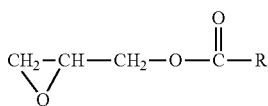

where R is a hydrocarbon radical containing from about 4 to about 26 carbon atoms. Preferably, R is a branched hydrocarbon group having from about 8 to about 10 carbon atoms, such as neopentyl, neoheptanyl or neodecanyl. Suitable glycidyl esters of carboxylic acids include VERSATIC ACID 911 and CARDURA E, each of which is commercially available from Shell Chemical Co.

The ethylenically unsaturated monomer (i) comprising hydroxyl functional groups is typically present in the reaction mixture that may be used to prepare the acrylic polymer in an amount of 1 to 20, more often 1 to 10 percent by weight, based on the total weight of monomers in the reaction mixture.

The reaction mixture that may be used to prepare the acrylic polymer of the present invention further comprises (ii) an ethylenically unsaturated monomer comprising polydialkylsiloxane, usually polydimethylsiloxane, functional groups. Such monomers may be prepared, for example, by reacting a polydialkylsiloxane having hydroxyl end groups with an ethylenically unsaturated monomer that has functional groups reactive with hydroxyl groups, such as acid or epoxy functional groups.

Examples of suitable ethylenically unsaturated monomer comprising polydialkylsiloxane functional groups include SILMER Mo8 (available from Siltech Corporation), X-22-2426 (available from Shin-Etsu Chemical Co), MCR-M07, MCR-M11, MCR-M17, MCR-M22, MCS-M11, MFR-M15 and MFS-M15 (available from Gelest, Inc), FM-0711, FM-0721 and FM-0725 (available from JNC Corporation).

The ethylenically unsaturated monomer (ii) comprising polydialkylsiloxane functional groups typically has a weight average molecular weight of 1,000 to 30,000, measured by GPC using polystyrene calibration standards, 2 PL gel MIXED-C as the column, THF as eluent at 1 ml/min and refractive index detector. The polydialkylsiloxane group is typically at least oligomeric, such that the resulting ethylenically unsaturated monomer is often a macromonomer.

The ethylenically unsaturated monomer (ii) comprising polydialkylsiloxane functional groups is typically present in the reaction mixture that can be used to prepare the acrylic polymer in an amount of 1 to 50, more often 10 to 30 percent by weight, based on the total weight of monomers in the reaction mixture.

The reaction mixture that may be used to prepare the acrylic polymer of the present invention further comprises (iii) silica nanoparticles that have been surface modified with compounds comprising ethylenically unsaturated functional groups. Such surface modification includes a chemical reaction such that the silica nanoparticle is chemically bonded to the compound comprising ethylenically unsaturated functional groups. Thus, when addition polymerization takes place in the reaction mixture, the acrylic polymer of the present invention has pendant silica particles chemically bonded and attached to the polymer.

As used herein, "nanoparticles" refers to particles having a particle size in the range from 1 to 100 nm. Unless otherwise indicated, "particle size" as used herein refers to the longest dimension of a particle, i.e. the diameter of the smallest sphere that completely encloses the particle. As used herein, "particle size" typically relates to the size of individual particles, i.e. primary particles, as opposed to aggregates or agglomerates of two or more individual particles, although this does not preclude that primary particles may actually be aggregated and/or agglomerated to some extent to form larger structures as the skilled artisan will appreciate. Furthermore, as the skilled artisan is aware of, a population of a plurality of nanoparticles is usually characterized by a distribution of particle sizes. Accordingly, "particle sizes" referred to herein are usually "average particle sizes". Unless otherwise indicated, the term "average particle size" as used herein means number weighted median particle size. The average particle size can be determined by visually examining a micrograph of a high resolution transmission microscopy (TEM) image, measuring for at least 50 particles the diameter of the smallest circle that completely encloses the respective particle, and calculating the average particle size as number weighted median of the measured diameters based on the magnification of the TEM image. One of ordinary skill in the art will understand how to prepare such a TEM image and determine the average particle size based on the magnification. Silica nanoparticles suitable in the present invention can have for example an average particle size in the range from 1 nm to 100 nm such as from 5 nm to 80 nm, or from 10 nm to 60 nm. Suitable silica nanoparticles include for example colloidal silica having average particle sizes ranging from 5 to 100 nm, such as NALCO 2326 Colloidal Silica (8 nm average particle size), NALCO 1034A Colloidal Silica (20 nm average particle size), NALCO 1060 Colloidal Silica (60 nm average particle size), NALCO 2329 Colloidal Silica (75 nm average particle size), available from NALCO, and Snowtex ST-O 15 nm average particle size silica, available from Nissan Chemical.

In particular embodiments where the acrylic polymer is to be used in a transparent curable film-forming composition (clear coat), it is desirable to use silica nanoparticles having an average particle size less than 50 nm, such as 5 to 30 nanometers, more often 10 to 20 nanometers. These smaller particle sizes contribute to reduced haze and color in a clear coat.

Suitable compounds comprising ethylenically unsaturated functional groups that may be used to modify the surface of the silica nanoparticles include vinyl trimethoxysilane, vinyl triethoxysilane, (meth)acryloxypropyl methyldi methoxysilane, (meth)acryloxypropyltrimethoxysilane, (meth)acryloxypropyl methyldiethoxysilane, (meth)acryloxypropyltriethoxysilane, and (meth)acryloxypropyltriisopropoxysilane.

The silica nanoparticles (iii) that have been surface modified with compounds comprising ethylenically unsaturated functional groups are typically present in the reaction mixture that may be used to prepare the acrylic polymer in an amount of 2 to 75, more often 10 to 60 percent by weight, based on the total weight of monomers in the reaction mixture.

The acrylic polymer according to the present invention described above may optionally comprise further (iv) fluorine functional groups. In certain embodiments of the present invention, the reaction mixture that may be used to prepare the acrylic polymer may then further comprise, in addition to the components (i), (ii) and (iii) described above, (iv) an ethylenically unsaturated monomer containing fluorine. Non-limiting examples of suitable ethylenically unsaturated monomers containing fluorine include fluoroethylene, chlorotrifluoroethylene, vinylidene fluoride, hexafluoropropylene, heptafluorobutyl(meth)acrylate, octafluoropentyl(meth)acrylate, dodecafluoroheptyl(meth)acrylate, tridecafluorooctyl(meth)acrylate, and heptadecafluorodecyl methacrylate. When used, these ethylenically unsaturated monomers containing fluorine are typically present in the reaction mixture used to prepare the acrylic polymer in an amount of 1 to 35 percent by weight, more often 10 to 30 percent by weight, based on the total weight of monomers in the reaction mixture.

One or more other polymerizable ethylenically unsaturated monomers may be included in the reaction mixture that may be used to prepare the acrylic polymer of the present invention. Useful alkyl esters of acrylic acid or methacrylic acid include aliphatic alkyl esters containing from 1 to 30, and preferably 4 to 18 carbon atoms in the alkyl group. Non-limiting examples include methyl(meth)acrylate, ethyl(meth)acrylate, butyl(meth)acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Styrene is most often used.

When used, these additional ethylenically unsaturated monomers are typically present in the reaction mixture used to prepare the acrylic polymer in an amount of 5 to 50, more often 10 to 30 percent by weight, based on the total weight of monomers in the reaction mixture.

In certain embodiments, the reaction mixture is essentially free of monomers having acid or anhydride functional groups. By "essentially free" of a material is meant that a composition has only trace or incidental amounts of a given material, and that the material is not present in an amount sufficient to affect any properties of the composition; typically less than 0.2 percent by weight, such as less than 0.1 percent by weight, or less than 0.05 percent by weight, based on the total weight of monomers in the reaction mixture.

The acrylic polymer of the present invention may be prepared using known addition polymerization techniques, such as organic solution polymerization techniques, in particular from the afore-mentioned reaction mixtures. Exemplary methods are illustrated in the examples below.

The present invention is further drawn to a curable film-forming composition comprising:
(a) a curing agent comprising reactive functional groups;
(b) a film-forming polymer comprising functional groups reactive with the reactive functional groups in (a); and
(c) an acrylic polymer component comprising:
(i) hydroxyl functional groups;
(ii) polydialkylsiloxane functional groups; and
(iii) silica nanoparticles that are chemically bonded to and pendant from an acrylic polymer, wherein the components (a), (b) and (c) are different from another.

The curing agent (a) used in the curable film-forming composition may be selected from one or more polyisocyanates such as diisocyanates and triisocyanates including biurets and isocyanurates. Diisocyanates include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and/or 4,4'-diphenylmethylene diisocyanate. Biurets of any suitable diisocyanate including 1,4-tetramethylene diisocyanate and 1,6-hexamethylene diisocyanate may be used. Also, biurets of cycloaliphatic diisocyanates such as isophorone diisocyanate and 4,4'-methylene-bis-(cyclohexyl isocyanate) can be employed. Examples of suitable aralkyl diisocyanates from which biurets may be prepared are meta-xylylene diisocyanate and α,α,α',α'-tetramethylmeta-xylylene diisocyanate.

Trifunctional isocyanates may also be used as the curing agent, for example, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, and DESMODUR N 3390, which is the isocyanurate of hexamethylene diisocyanate, available from Bayer Corporation. Specifically used polyisocyanates are trimers of diisocyanates such as hexamethylene diisocyanate and isophorone diisocyanate. Desmodur Z 4470 BA, an aliphatic polyisocyanate based on isophorone diisocyanate available from Bayer Corporation, is also suitable.

The polyisocyanate may also be one of those disclosed above, chain extended with one or more polyamines and/or polyols using suitable materials and techniques known to those skilled in the art to form a polyurethane prepolymer having isocyanate functional groups.

Mixtures of aliphatic polyisocyanates are particularly suitable.

The curing agent (a) used in the curable film-forming composition may alternatively or additionally be selected from one or more aminoplast resins. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541, which is hereby incorporated by reference.

The aminoplast resins often contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. Many aminoplast resins are partially alkylated with methanol or butanol.

The curing agent (a) is typically present in the film-forming compositions in an amount ranging from 10 to 90 percent by weight, such as 30 to 65 percent by weight, often 45 to 60 percent by weight, based on the total weight of resin solids in the composition.

The curable film-forming composition of the present invention further comprises at least one film-forming polymer (b) having multiple functional groups reactive with the functional groups in (a). Such functional groups are typically hydroxyl and/or amine functional groups.

The film-forming polymer (b) may comprise an addition polymer, polyester polymer, polyurethane polymer, polyether polymer, polyester acrylate, and/or polyurethane acrylate. Often an acrylic polymer and/or polyester polymer having multiple hydroxyl functional groups is used.

Suitable acrylic polymers include copolymers of one or more alkyl esters of acrylic acid or methacrylic acid, together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer useful as the film-forming polymer (b) can include hydroxyl functional groups, which are often incorporated into the polymer by including one or more hydroxyl functional monomers in the reactants used to produce the copolymer. Useful hydroxyl functional monomers include those disclosed above. The acrylic polymer can also be prepared with N-(alkoxymethyl)acrylamides and N-(alkoxymethyl)methacrylamides.

Carbamate functional groups can be included in the acrylic polymer useful as the film-forming polymer (b) by copolymerizing the acrylic monomers with a carbamate functional vinyl monomer, such as a carbamate functional alkyl ester of methacrylic acid. Alternatively, carbamate functionality may be introduced into the acrylic polymer useful as the film-forming polymer (b) by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other useful carbamate functional monomers are disclosed in U.S. Pat. No. 5,098,947, which is incorporated herein by reference.

Amide functionality may be introduced to the acrylic polymer useful as the film-forming polymer (b) by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

A polyester polymer may also be used in the curable film-forming composition as the film-forming polymer (b). Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Polyesters derived from cyclic esters such as caprolactone are also suitable. Polyester acrylates, such as acrylic polymers having polyester side chains, may also be used.

Polyurethanes can also be used in the curable film-forming composition as the film-forming polymer (b). Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Any of those disclosed above may be used in the preparation of the polyurethane. Polyurethane acrylates, such as acrylic polymers having polyurethane side chains, may also be used.

Examples of polyether polyols are polyalkylene ether polyols which include those having the following structural formula:

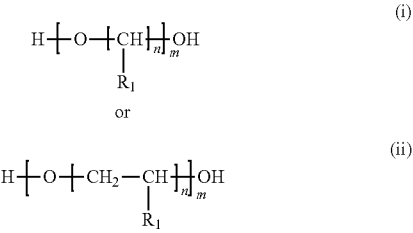

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene)glycols, poly(oxyethylene)glycols, poly(oxy-1,2-propylene)glycols, and poly(oxy-1,2-butylene)glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp.

Useful amine functional film-forming polymers, polyoxypropylene amines commercially available under the trademark designation JEFFAMINE®; amine functional acrylic polymers and polyester polymers prepared as known in the art are also suitable.

The film-forming polymer (b) is typically present in the film-forming compositions in an amount ranging from 10 to 90 percent by weight, such as 30 to 60 percent by weight, often 40 to 50 percent by weight, based on the total weight of resin solids in the composition.

The curable film-forming composition used in the method of the present invention further comprises (c) an acrylic polymer component comprising (i) hydroxyl functional groups; (ii) polydialkylsiloxane functional groups; and (iii) silica nanoparticles that are chemically bonded to and pendant from an acrylic polymer.

Each of the functional components (i), (ii) and (iii) are present in the acrylic polymer component (c), but they need not all be on the same polymer molecule. For example, the acrylic polymer component (c) may comprise one polymer, wherein all of the functional components (i), (ii) and (iii) are present on the same polymer. In this embodiment, acrylic polymer component (c) may comprise the acrylic polymer of the present invention described above. Alternatively, the acrylic polymer component (c) may comprise a plurality of acrylic polymers, wherein at least one of each of the hydroxyl functional groups (i), polydialkylsiloxane functional groups (ii), and silica nanoparticles (iii) is present on each acrylic polymer. In this alternative embodiment, the acrylic polymer of the present invention described above may or may not be included in the acrylic polymer component.

In certain embodiments of the present invention, the acrylic polymer component (c) further comprises fluorine functional groups. The fluorine functional groups may be present on a polymer molecule with any of the other functional components (i), (ii) and (iii).

Typical amounts of acrylic polymer component (c) in the curable film-forming composition range from 1 to 50 percent by weight, such as 2 to 30 percent by weight, often 2 to 10 percent by weight, based on the total weight of resin solids in the curable film-forming composition.

The curable film-forming compositions of the present invention may further comprise a filler. Examples of fillers that can be present include finely divided minerals such as barium sulfate, silica, including fumed silica and colloidal silica, alumina, colloidal alumina, titanium dioxide, zirconia, colloidal zirconia, clay, mica, dolomite, talc, magnesium carbonate, calcium carbonate, calcium sulfate, calcium silicate, and/or calcium metasilicate. It is believed that the fillers, in combination with the resins in the composition, allow for useful rheological properties such as high viscosity at low shear. Fillers such as colloidal silica may also serve to enhance mar and scratch resistance.

The film-forming composition can additionally include a variety of optional ingredients and/or additives that are somewhat dependent on the particular application of the curable composition, such as other curing catalysts, pigments or other colorants, reinforcements, thixotropes, accelerators, surfactants, plasticizers, extenders, stabilizers, corrosion inhibitors, diluents, hindered amine light stabilizers, UV light absorbers, adhesion promoters, and antioxidants. The curable film-forming composition may be a color coat or clear coat; it may be opaque, translucent, tinted transparent, or colorless transparent.

The curable compositions used in the present invention can be prepared as a two-package composition, often curable at ambient temperature. Two-package curable compositions are typically prepared by combining the ingredients immediately before use. The curable film-forming compositions may alternatively be prepared as one-package systems.

The present invention is further drawn to a coated substrate, comprising: A) a substrate having at least one coatable surface, and B) the curable film-forming composition described above, applied to at least one surface of the substrate.

Suitable substrates include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. In certain embodiments of the present invention, the substrate comprises a composite material such as a plastic or a fiberglass composite.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water, with a solvent, or an aqueous solution of rinsing agents in order to remove any residue. The substrate can be air dried, for example, by using an air knife, by flashing off the water by brief exposure of the substrate to a high temperature or by passing the substrate between squeegee rolls.

The substrate may be a bare, cleaned surface; it may be oily, pretreated with one or more pretreatment compositions, and/or prepainted with one or more coating compositions, primers, topcoats, etc., applied by any method including, but not limited to, electrodeposition, spraying, dip coating, roll coating, curtain coating, and the like.

The compositions may be applied to the substrate by one or more of a number of methods including spraying, dipping/immersion, brushing, or flow coating, but they are most often applied by spraying. The usual spray techniques and equipment for air spraying and electrostatic spraying and either manual or automatic methods can be used. The coating layer typically has a dry film thickness of 1-25 mils (25.4-635 microns), often 5-25 mils (127-635 microns).

The film-forming compositions can be applied directly to the surface of a substrate or onto a primer coat or other coating as noted above, such as an electrocoat or topcoat, on the substrate to form a coated substrate in accordance with the present invention. Suitable electrocoat compositions include ED 6465; primers include HP78224EH, both commercially available from PPG Industries, Inc. Alternatively, a primer may not be used and the film-forming compositions can be applied directly to a pigmented basecoat or other coating. Multiple coating layers such as an electrocoat and a primer and optionally a colored base coat may be applied to the substrate prior to application of the curable film-forming composition of the present invention.

After forming a film of the coating on the substrate, the composition can be cured by allowing it to stand at ambient temperature (such as a typical room temperature, 72° F. (22.2° C.)), or a combination of ambient temperature cure and baking, or by baking alone. The composition may be cured at ambient temperature typically in a period ranging from about 24 hours to about 36 hours. If ambient temperature and baking are utilized in combination, the composition is often allowed to stand ("flash") for a period of from about 2 minutes to about 120 minutes at a temperature ranging from ambient to 175° F. (79.4° C.), followed by baking at a temperature up to about 300° F. (148.9° C.), usually 285° F. (140.6° C.) for a period of time ranging from about 20 minutes to about 1 hour.

After application of the curable film-forming composition to the substrate and upon curing, the coated substrate demonstrates a water contact angle greater than 92°, and a total surface energy less than 29 mN/m. The coated substrate additionally demonstrates adhesive release of asphalt from the surface. "Adhesive release" is a release of the asphalt without removal of any of the coating composition from the substrate, as opposed to "cohesive release", wherein either at least a portion of the coating composition is removed with the asphalt, thereby damaging the coated substrate, or a portion of the asphalt remains attached to the coated substrate after cleaning. After application of the curable film-forming composition to the substrate and upon curing, the coated substrate demonstrates adhesive release with a maximum average pulling force of 20 N when subjected to ASPHALT ADHESION TEST described below. Such properties render the curable film-forming compositions of the present invention particularly suitable for use in methods of mitigating dirt build-up on a substrate, in accordance with the present invention.

In the method of the present invention, dirt build-up on a substrate is mitigated by applying to at least a portion of the substrate the curable film-forming composition described above and then at least partially curing the curable film-forming composition. A curable film-forming composition is applied to at least one surface of the substrate. A substrate may have one continuous surface, or two or more surfaces such as two opposing surfaces. Typically the surface that is coated is any that is expected to be exposed to conditions conducive to dirt build-up, such as consumer and industrial vehicles and building structures. By "dirt" is meant soil, grease, oil, minerals, detergent, salt, tar, asphalt, animal droppings, tree sap, and the like; contaminants that are commonly found outside or in industrial settings, and that tend to adhere to vehicle surfaces.

Each of the embodiments and characteristics described above, and combinations thereof, may be said to be encompassed by the present invention. For example, the present invention is thus drawn to the following nonlimiting aspects: In a first embodiment an acrylic polymer is provided, comprising: (i) hydroxyl functional groups; (ii) polydialkylsiloxane functional groups; and (iii) silica nanoparticles that are chemically bonded to and pendant from the acrylic polymer. As used herein, the terms "aspect" and "embodiment" are used interchangeably.

In a second embodiment the acrylic polymer according to the first embodiment described above may be prepared from a reaction mixture comprising: (i) an ethylenically unsaturated monomer comprising hydroxyl functional groups; (ii) an ethylenically unsaturated monomer comprising polydialkylsiloxane functional groups; and (iii) silica nanoparticles that have been surface modified with compounds comprising ethylenically unsaturated functional groups.

In a third embodiment the reaction mixture used to prepare the acrylic polymer according to the foregoing second embodiment may comprise an ethylenically unsaturated monomer (i) comprising hydroxyl functional groups such as hydroxyethyl(meth)acrylate, hydroxypropyl(meth)acrylate, and/or hydroxybutyl(meth)acrylate.

In a fourth embodiment the reaction mixture used to prepare the acrylic polymer according to any one of the second embodiment or third embodiment described above may comprise an ethylenically unsaturated monomer (ii) comprising polydialkylsiloxane functional groups that has a weight average molecular weight of 1,000 to 30,000.

In a fifth embodiment the acrylic polymer of any one of the preceding embodiments described above may further comprise (iv) fluorine functional groups. Such acrylic polymer may be prepared from any one of the reaction mixtures according to the second, third and fourth embodiment described above, wherein the reaction mixture further comprises (iv) an ethylenically unsaturated monomer containing fluorine. The ethylenically unsaturated monomer containing fluorine used herein may for example comprise chlorotrifluoroethylene, vinylidene fluoride, hexafluoropropylene, and/or octafluoro(meth)acrylate In a sixth embodiment a curable film-forming composition is also provided by the present invention, comprising: (a) a curing agent comprising reactive functional groups; (b) a film-forming polymer comprising functional groups reactive with the reactive functional groups in (a); and (c) an acrylic polymer component comprising: (i) hydroxyl functional groups; (ii) polydialkylsiloxane functional groups; and (iii) silica nanoparticles that are chemically bonded to and pendant from an acrylic polymer, and optionally, (iv) fluorine functional groups, wherein the components (a), (b) and (c) are different from another.

In a seventh embodiment in the composition according to the sixth embodiment described above, the curing agent (a) may comprise a polyisocyanate and/or an aminoplast, such as a mixture of aliphatic polyisocyanates.

In an eighth embodiment in any of the compositions according to any one of the sixth embodiment or seventh embodiment described above, the film-forming polymer (b) may comprise an addition polymer, a polyether polymer, a polyester polymer, a polyester acrylate polymer, a polyurethane polymer, and/or a polyurethane acrylate polymer.

In a ninth embodiment in any of the composition according to any one of the sixth, seventh or eighth embodiment described above, the acrylic polymer component (c) may comprise an acrylic polymer according to any one of the first to fifth embodiment described above.

In a tenth embodiment in any of the composition according to any one of the sixth, seventh, eighth or ninth embodiment described above, the acrylic polymer component (c) may comprise a plurality of acrylic polymers, wherein at least one of each of the hydroxyl functional groups (i), polydialkylsiloxane functional groups (ii), and silica nanoparticles (iii) is present on each acrylic polymer.

In an eleventh embodiment a coated substrate is also provided by the present invention, comprising:
A) a substrate having at least one coatable surface, and B) a curable film-forming composition applied to at least one surface of the substrate, wherein the film-forming composition is prepared from the curable film-forming composition according to any one of the sixth, seventh, eighth, ninth or tenth embodiment described above.

In a twelfth embodiment a method of mitigating dirt build-up on a substrate is provided by the present invention, comprising (1) applying to at least a portion of the substrate a curable film-forming composition according to any one of the sixth, seventh, eighth, ninth or tenth embodiment described above, and (2) at least partially curing the curable film-forming composition.

The following examples are intended to illustrate various embodiments of the invention, and should not be construed as limiting the invention in any way.

EXAMPLES

To evaluate the effectiveness of coating formulation changes on dirt adhesion, an ASPHALT ADHESION TEST was developed. Generally, the procedure is as follows: A 4"×12" test panel is coated on both sides with the desired coating(s). After the appropriate cure time, one-quarter inch diameter plastic compression sleeves are placed on the test panel surface and filled with about 0.15 grams of Asphalt Thin Crack Filler, available from CP Industries of Salt Lake City, Utah. The asphalt in the compression sleeves is dried in a 150° F. oven for one hour. A minimum of 16 hours drying time at room temperature is allowed before attempting to remove the asphalt-filled sleeves from the test panel surface. The asphalt-filled sleeves are pulled off the clear surface by using an INSTRON MINI 44 machine and the associated software, made by Instron Corporation of Norwood, Mass. to obtain a quantitative value. A ring device attached to the arm of the Instron machine pulls the asphalt sleeve from the surface of the panel at an 80 mm/minute pulling rate. Typically, the asphalt-filled sleeve adhesively releases from the coated substrates of the present invention between 0 to 20 N. Higher values are typically seen for cohesive failure within the asphalt on other coated substrates.

Example A

A dispersion of silica in DOWANOL PM (available from Dow Chemical Co.) was prepared via the following procedure. 564 g of NALCO 1340 from NALCO were charged into 5-liter reaction kettle equipped with a thermocouple, stirrer, reflux condenser and nitrogen inlet. The mixture was heated to 70° C., and held for 10 minutes. After that, a mixture of 1600 g DOWANOL PM and 20 g SILQUEST A174 (methacryloxypropyltrimethoxysilane) from Momentive was charged into flask over 1 hour, and held for 30 minutes at 70° C. The temperature was then increased to 110° C. to distill out 800 g solvent mixture. After that, a mixture of 100 g styrene, 20 g 4-hydroxybutyl acrylate and 20 g SILMER Mo8 from Siltech was charged over 1 hour, simultaneously with a mixture of 8 g LUPEROX 26 available from Luperox and 35 g DOWANOL PM. After completion of charge, the system was held at 110° C. for 30 minutes. A mixture of 2 g LUPEROX 26 and 35 g DOWANOL PM was charged into flask, and held for an additional 1 hour. Finally, the temperature was increased to distill out 700 g solvent. The solid of final dispersion was measured to be 35.7 wt %.

Example B

A dispersion of silica in DOWANOL PM was prepared via the following procedure. 564 g of NALCO 1340 from NALCO were charged into 5-liter reaction kettle equipped with a thermocouple, stirrer, reflux condenser and nitrogen inlet. The mixture was heated to 70° C., and held for 10 minutes. After that, a mixture of 1600 g DOWANOL PM and 20 g SILQUEST A174 from Momentive was charged into flask over 1 hour, and held for 30 minutes at 70° C. The temperature was then increased to 110° C. to distill out 800 g solvent mixture. After that, a mixture of 50 g styrene, 20 g 4-hydroxybutyl acrylate, 50 g tridecafluorooctyl acrylate from Sumwise and 20 g SILMER Mo8 from Siltech was charged over 1 hour, simultaneously with a mixture of 8 g LUPEROX 26 and 35 g DOWANOL PM. After completion of charge, the system was held at 110° C. for 30 minutes. A mixture of 2 g LUPEROX 26 and 35 g DOWANOL PM was charged into flask, and held for an additional 1 hour. Finally, the temperature was increased to distill out 700 g solvent. The solid of final dispersion was measured to be 38.4 wt %.

Clear film-forming compositions according to the present invention were prepared from the following ingredients. Comparative Example 1 is a clear film-forming composition commercially available from PPG Industries, Inc., as CERAMICLEAR 7.1.

TABLE 1

CLEAR COATING EXAMPLES

| Name | Description | Manufacturer | Total Weight (grams) Example 2 | Total Weight (grams) Example 3 |
|---|---|---|---|---|
| N-Amyl Acetate | Solvent | Dow Chemical Co. | 19.43 | 19.43 |
| SOLVESSO 100 | Solvent | EXXON | 10.38 | 10.38 |
| DOWANOL PMA | Solvent | Dow Chemical Co. | 4.88 | 4.88 |
| N-Butyl Acetate | Solvent | BASF Corp. | 15.09 | 15.09 |
| Butyl Carbitol Acetate | Solvent | Dow Chemical Co. | 2.01 | 2.01 |
| BYK 378 | Additive | BYK CHEMIE | 0.02 | 0.02 |
| BYK 390 | Additive | BYK CHEMIE | 0.06 | 0.06 |
| TINUVIN 928 | UVA Additive | BASF Corp. | 1.91 | 1.91 |
| TINUVIN 123 | HALS Additive | BASF Corp. | 0.49 | 0.49 |
| Acrylic Polyol Resin A | Acrylic Resin[1] | PPG | 33.40 | 33.40 |
| Acrylic Polyol Resin B | Acrylic Resin[2] | PPG | 36.94 | 36.94 |
| Polyester Resin A | Polyester Resin[3] | PPG | 10.16 | 10.16 |
| CYMEL 202 | Melamine Resin | ALLNEX | 6.03 | 6.03 |
| Colloidal Silica Dispersion A | Silica Particle[4] | PPG | 5.03 | 5.03 |
| Acrylic Polymer of Example A | Acrylic + Silica | PPG | 9.80 | 0 |
| Acrylic Polymer of Example B | Acrylic + Silica | PPG | 0 | 9.11 |
| Acrylic Borate Resin | Acrylic Resin[5] | PPG | 3.47 | 3.47 |
| Phenyl Acid Phosphate | Catalyst | Solvay USA | 0.64 | 0.64 |
| DESN 3390A | Isocyanate Resin | BAYER Material Science | 29.05 | 29.05 |
| DESZ 4470BA | Isocyanate Resin | BAYER Material Science | 5.93 | 5.93 |

[1] Acrylic Polyol Resin A made of 14.5 wt % Butyl Methacrylate, 14.9 wt % Butyl Acrylate, 20.4 wt % Hydroxyethyl Methacrylate, 22.6 wt % Hydroxypropyl Methacrylate and 27.6 wt % Isobornyl Methacrylate made at 63.5% weight solids in a 93.6 wt % Aromatic 100/6.4 wt % DOWANOL PM solvent mixture with a GPC weight average molecular weight of 6,600.
[2] Acrylic Polyol Resin B made of 14.5 wt % Butyl Methacrylate, 14.9 wt % Butyl Acrylate, 20.4 wt % Hydroxyethyl Methacrylate, 22.6 wt % Hydroxypropyl Methacrylate, 27.5 wt % Isobornyl Methacrylate and 0.1 wt % Methacrylic Acid, made at 58.2% weight solids in a 79.7 wt % Aromatic 100, 15.1 wt % N-Amyl Acetate, 5.2 wt % Dowanol PM solvent mixture with a GPC weight average molecular weight of 10,300.
[3] Polyester Resin A made of 52.3 wt % EMPOL 1008, 13.5 wt % Adipic Acid and 34.2 wt % Trimethylol Propane made at 76.2 wt % weight solids in Aromatic 100 solvent with a GPC weight average molecular weight of 9,700.
[4] Colloidal Silica Dispersion A is Colloidal Silica MT-ST available from Nissan Chemical Industries dispersed in a modified siloxane polyol resin. The dispersion is made in a step wise process:
1) Synthesis of the siloxane polyol resin using SILRES SY 816VP (Methyl hydrogen polysiloxane resin from Wacker Chemie AG) and Trimethylolpropanemonoallyl ether using a hydrosilation reaction to form a Siloxane Polyol resin at 100% solids with a GPC weight average molecular weight of 6,500.
2) Adding Methyl Amyl Ketone solvent to the Siloxane Polyol resin to obtain a weight solids of 72%.
3) Adding the NISSAN CHEMICAL Colloidal Silica MT-ST (supplied at 30 wt % solids in Methanol) to the reduced siloxane polyol resin of step 2.
4) Removal of the Methanol solvent using distillation.
5) Chemical modification of the Siloxane Polyol resin with Methyl HHPA and Cardura E-10 in the presence of additional Methyl Amyl Ketone to form a final product made of 31.4 wt % SILRES SY 816VP, 12.4 wt % NISSAN CHEMICAL MT-ST Colloidal Silica, 18.5 wt % Methyl HHPA and 37.7 wt % CARDURA E-10 made using 0.0015 wt % N,N-Dimethyl Benzyl Amine catalyst.
6) The final product is a colloidal dispersion of silica particles with about 12 nm average particle size in Siloxane Polyol resin supplied in Methyl Amyl Ketone at 74% weight solids.
[5] Acrylic Borate Resin made of 56.0 wt % Butyl acrylate, 37.4 wt % Hydroxyethyl acrylate, 6.6 wt % Boric Acid made at 53% weight solids in a 53.2 wt % Butanol and 46.8 wt % SOLVESSO 100 solvent blend with a GPC weight average molecular weight of 7,600.

Clear coat comparative example 1 and clear examples 2 and 3 were spray applied onto 4 inch by 12 inch cold rolled steel panels that were pre-coated with cured ED 6465 Electrocoat and cured HP78224EH primer. The substrate panels are available from ACT Test Panels LLC of Hillsdale, Mich. Two coats of either Jett Black (BIPCU668) or Alpine White (BIPCU300) water based basecoat were applied to the ACT substrate panels using a SPRAYMATION machine before the clears were applied. The water basecoats are available from PPG Industries. Both basecoats were allowed to flash for five minutes at room temperature and for ten minutes at 158° F. before two coats of clear coat were applied. The cured film thickness of the Jett Black Basecoat was about 0.5 mils. The cured film thickness of the Alpine White basecoat was about 1.1 mils. The clears were flashed for ten minutes at room temperature (72° F.) before baking for thirty minutes at 285° F.

Water and Hexadecane contact angles were measured using a KRUSS DSA 100 instrument made by KRUSS GmbH of Hamburg, Germany and the associated software. The surface energy numbers are based upon Owens-Wendt calculations. Clear coat examples 2 and 3 have higher contact angles and lower surface energies as Table 2 shows below.

TABLE 2

| | CLEAR COAT | | | | | |
|---|---|---|---|---|---|---|
| | Water Contact Angle ° Basecoat | | Hexadecane Contact Angle ° Basecoat | | Total Surface Energy mN/m Basecoat | |
| | Jett Black | Alpine White | Jett Black | Alpine White | Jett Black | Alpine White |
| Comparative Example 1 | 89.5 | 85.1 | 5.4 | 5.3 | 30.4 | 31.9 |
| Example 2 | 96.8 | 95.2 | 5.7 | 5.5 | 28.6 | 28.9 |
| Example 3 | 99.7 | 99.2 | 24.7 | 24.7 | 26.1 | 26.1 |

Table 3 provides appearance and hardness values. The 20° Gloss was measured using a NOVO-GLOSS statistical gloss meter available from Paul N. Gardner Company of Pompano Beach, Fla. The DOI was measured using a DOI/Haze meter available from TRICOR SYSTEMS, Inc. of Elgin, Ill. The clear hardness was measured using the HM 2000 FISCHER hardness instrument available from Helmut Fischer GmbH+ Co. KG of Sindelfingen, Germany. Table 3 shows that the appearance and hardness values of examples 2 and 3 are essentially equivalent to that of the comparative example 1.

TABLE 3

| CLEAR COAT | | | | | |
|---|---|---|---|---|---|
| 20° Gloss Basecoat | | DOI Basecoat | | FISCHER Hardness N/mm$^2$ Basecoat | |
| Jett Black | Alpine White | Jett Black | Alpine White | Jett Black | Alpine White |
| Comparative Example 1 | | | | | |
| 85 | 85 | 96 | 95 | 143 | 130 |
| Example 2 | | | | | |
| 84 | 84 | 93 | 92 | 141 | 125 |
| Example 3 | | | | | |
| 84 | 84 | 94 | 92 | 140 | 138 |

The asphalt release property is shown in Table 4. The ability to release asphalt from the clear surface is a measure of ease of cleaning.

Table 4 shows that the clear coating examples 2 and 3 are easier to clean as measured by the adhesive release of asphalt from the clear surface. The ASPHALT ADHESION TEST was done using the clears on Alpine White basecoat.

TABLE 4

| CLEAR COAT | Asphalt Release Test |
|---|---|
| Comparative Example 1 | Cohesive |
| Example 2 | Adhesive |
| Example 3 | Adhesive |

Whereas particular embodiments of this invention have been described above for purposes of illustration, it will be evident to those skilled in the art that numerous variations of the details of the present invention may be made without departing from the scope of the invention as defined in the appended claims.

Therefore, we claim:

1. An acrylic polymer comprising:
   (i) hydroxyl functional groups;
   (ii) polydialkylsiloxane functional groups; and
   (iii) silica nanoparticles that are chemically bonded to and pendant from the acrylic polymer.

2. The acrylic polymer of claim 1, further comprising (iv) fluorine functional groups.

3. The acrylic polymer of claim 1, wherein the polymer is prepared from a reaction mixture comprising:
   (i) an ethylenically unsaturated monomer comprising hydroxyl functional groups;
   (ii) an ethylenically unsaturated monomer comprising polydialkylsiloxane functional groups; and
   (iii) silica nanoparticles that have been surface modified with compounds comprising ethylenically unsaturated functional groups.

4. The acrylic polymer of claim 3, wherein the ethylenically unsaturated monomer (i) comprising hydroxyl functional groups comprises hydroxyethyl(meth)acrylate, hydroxypropyl(meth)acrylate, and/or hydroxybutyl(meth)acrylate.

5. The acrylic polymer of claim 3, wherein the ethylenically unsaturated monomer (ii) comprising polydialkylsiloxane functional groups has a weight average molecular weight of 1,000 to 30,000.

6. The acrylic polymer of claim 2, wherein the polymer is prepared from a reaction mixture comprising:
   (i) an ethylenically unsaturated monomer comprising hydroxyl functional groups;
   (ii) an ethylenically unsaturated monomer comprising polydialkylsiloxane functional groups;
   (iii) silica nanoparticles that have been surface modified with compounds comprising ethylenically unsaturated functional groups; and
   (iv) an ethylenically unsaturated monomer containing fluorine.

7. The acrylic polymer of claim 6, wherein the ethylenically unsaturated monomer containing fluorine comprises chlorotrifluoroethylene, vinylidene fluoride, hexafluoropropylene, and/or octafluoro(meth)acrylate.

8. A curable film-forming composition comprising:
   (a) a curing agent comprising reactive functional groups;
   (b) a film-forming polymer comprising functional groups reactive with the reactive functional groups in (a); and
   (c) an acrylic polymer component comprising:
      (i) hydroxyl functional groups;
      (ii) polydialkylsiloxane functional groups; and
      (iii) silica nanoparticles that are chemically bonded to and pendant from an acrylic polymer,
   wherein the components (a), (b) and (c) are different from another.

9. The composition of claim 8, wherein the curing agent (a) comprises a polyisocyanate and/or an aminoplast.

10. The composition of claim 9, wherein the curing agent (a) comprises a mixture of aliphatic polyisocyanates.

11. The composition of claim 8, wherein the film-forming polymer (b) comprises an addition polymer, a polyether polymer, a polyester polymer, a polyester acrylate polymer, a polyurethane polymer, and/or a polyurethane acrylate polymer.

12. The composition of claim 8, wherein the acrylic polymer component (c) comprises an acrylic polymer comprising:
   (i) hydroxyl functional groups;
   (ii) polydialkylsiloxane functional groups; and
   (iii) silica nanoparticles that are chemically bonded to and pendant from the acrylic polymer.

13. The composition of claim 8, wherein the acrylic polymer component (c) further comprises fluorine functional groups.

14. A coated substrate comprising:
   A) a substrate having at least one coatable surface, and
   B) a curable film-forming composition applied to at least one surface of the substrate, wherein the film-forming composition is prepared from the curable film-forming composition of claim 8.

15. A method of mitigating dirt build-up on a substrate, comprising:
   (1) applying to at least a portion of the substrate a curable film-forming composition comprising:
      (a) a curing agent comprising reactive functional groups;
      (b) a film-forming polymer comprising functional groups reactive with the reactive functional groups in (a); and (c) an acrylic polymer component comprising:
  (i) hydroxyl functional groups;
  (ii) polydialkylsiloxane functional groups; and
  (iii) silica nanoparticles that are chemically bonded to and pendant from an acrylic polymer, wherein components (a), (b) and (c) are different from another, and
(2) at least partially curing the curable film-forming composition.

16. The method of claim 15, wherein the curing agent (a) comprises a polyisocyanate and/or an aminoplast.

17. The method of claim 16, wherein the curing agent (a) comprises a mixture of aliphatic polyisocyanates.

18. The method of claim 15, wherein the film-forming polymer (b) comprises an addition polymer, a polyether polymer, a polyester polymer, a polyester acrylate polymer, a polyurethane polymer, and/or a polyurethane acrylate polymer.

19. The method of claim 15, wherein the acrylic polymer component (c) comprises an acrylic polymer comprising:
  (i) hydroxyl functional groups;
  (ii) polydialkylsiloxane functional groups; and
  (iii) silica nanoparticles that are chemically bonded to and pendant from the acrylic polymer.

20. The method of claim 15, wherein the acrylic polymer component (c) further comprises fluorine functional groups.

* * * * *